(12) United States Patent
Vecera et al.

(10) Patent No.: US 9,342,338 B2
(45) Date of Patent: May 17, 2016

(54) APPLICATION MIGRATION IN A PROCESS VIRTUAL MACHINE ENVIRONMENT

(71) Applicant: Red Hat, Inc., Raleigh, NC (US)

(72) Inventors: Martin Vecera, Brno (CZ); Jiri Pechanec, Mokra-Horakov (CZ)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 14/514,902

(22) Filed: Oct. 15, 2014

(65) Prior Publication Data

US 2016/0110210 A1    Apr. 21, 2016

(51) Int. Cl.
*G06F 9/45* (2006.01)
*G06F 9/455* (2006.01)

(52) U.S. Cl.
CPC .................. *G06F 9/45533* (2013.01)

(58) Field of Classification Search
None
See application file for complete search history.

(56) References Cited

U.S. PATENT DOCUMENTS

| | | | |
|---|---|---|---|
| 8,190,769 B1 | 5/2012 | Shukla et al. | |
| 8,331,362 B2 | 12/2012 | Shukla et al. | |
| 8,606,890 B2 | 12/2013 | Hadas et al. | |
| 2009/0249334 A1* | 10/2009 | Yamaguchi | G06F 9/455 718/1 |
| 2013/0198355 A1 | 8/2013 | Kalyanaraman et al. | |
| 2013/0212709 A1* | 8/2013 | Tucker | G06F 21/55 726/29 |
| 2014/0019621 A1 | 1/2014 | Khan et al. | |
| 2014/0115584 A1 | 4/2014 | Mudigonda et al. | |

OTHER PUBLICATIONS

KVM, "Migration" http://www.linux-kvm.org/page/Migration, 5 pages.
"How does migrating a running Virtual-Machine From One Hypervisor to Another Actually Work?", http://www.serverfault.com/questions/591647/how-does-migrating-a-running-virtual-machine-from-one-hypervisor-to-another-actu, 2 pages.
Y. Li, Problem Statement on Address Resolution in Virtual Machine Migration Draft-Liyz-Armd-VM-Migration-ps-oo-txt; http://tools.ieft.org/html/draft-liyz-armd-vm-migration-ps-00; Oct. 18, 2010, 9 pages.

* cited by examiner

*Primary Examiner* — Chuck Kendall
(74) *Attorney, Agent, or Firm* — Lowenstein Sandler LLP

(57) ABSTRACT

A mechanism for migrating an application in a process virtual machine environment. A method includes pausing execution of an application in a source process virtual machine (PVM). The method also includes recording a state of the source PVM at a time of the pausing of the execution of the application. The method further includes copying the recorded state of the source PVM into a destination PVM, wherein the destination PVM resumes the execution of the application using the recorded state.

20 Claims, 4 Drawing Sheets

APPLICATION MIGRATION IN A PROCESS VIRTUAL MACHINE ENVIRONMENT

TECHNICAL FIELD

The embodiments of the invention relate generally to a computer system and, more specifically, relate to application migration in a process virtual machine environment.

BACKGROUND

Many cloud solutions provide dynamic provisioning of creating a new process virtual machine when a cluster in a cloud cannot handle a load assigned to the cluster. A process virtual machine is an abstract computing machine that provides a platform-independent programming environment that abstracts away details of underlying hardware or operating system and allows a program to execute in the same way on any platform. One example process virtual machine is a Java™ virtual machine (JVM). In the case of process virtual machines, it may be sufficient to start a new process virtual machine with a new node in the cloud. In order to dynamically handle different loads, a new process virtual machine may be created on the same machine (or in a different machine), or an existing process virtual machine may be destroyed.

Currently, in order to create a new process virtual machine, an application executing in the existing process virtual machine is stopped and a application in the new process virtual machine is initialized with new configuration settings and system resources.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Embodiments of the disclosure are directed to application migration in a process virtual machine environment. In one embodiment, a new process virtual machine is created on a same computer system as an existing process virtual machine. In another embodiment, a new process virtual machine is created on a computer system different from the computer system with the existing process virtual machine. The application is migrated from the existing process machine to the newly created process virtual machine.

A method of one embodiment includes pausing execution of an application in a source (e.g., originating) process virtual machine. The method also includes recording a state of the source process virtual machine at a time of the pausing of the execution of the application. The method further includes copying the recorded state of the source process virtual machine into a destination process virtual machine. The destination process virtual machine resumes the execution of the application using the recorded state.

Prior solutions for migrating the application present several disadvantages. As discussed above, in order to create a new process virtual machine, an application executing in the existing process virtual machine needs to be stopped and a new application in the newly created process virtual machine is started from the very beginning with all new configurations and system resources. As such, stopping execution in one process virtual machine and starting again from the beginning in another process virtual machine with new configurations may be costly, time consuming and disruptive to the process virtual machines. Embodiments of the disclosure overcome these disadvantages by pausing execution of the application executing in the existing process virtual machine, recording state of the existing process virtual machine at the paused state and copying the recorded state of the existing process virtual machine into the newly created process virtual machine.

Figure 1:
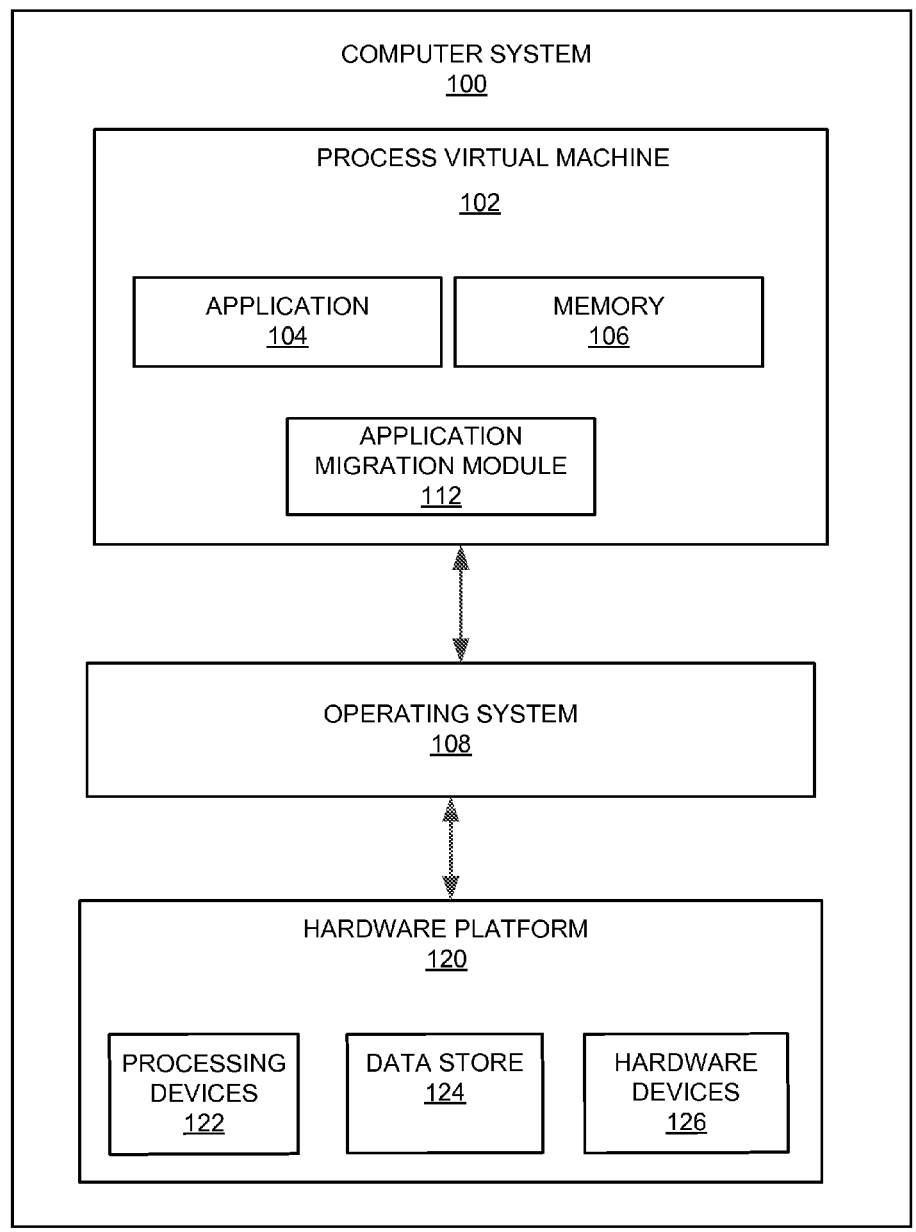
FIG. 1 is a block diagram of a Java™ virtual machine in which embodiments of the invention may operate.

FIG. 1 illustrates computer system 100 according to an embodiment of the invention. In one embodiment, the computer system 100, which may be a machine such as, for example, any variety of user devices, such as a personal computer (PC), a laptop, a mobile phone, mobile smart phone, a tablet computer, handheld devices, netbooks, or any other computing device. In one embodiment, the computer system 100 includes a process virtual machine (PVM) 102 in which embodiments of the disclosure may operate. A process virtual machine is an abstract computing machine that provides a platform-independent programming environment that abstracts away details of underlying hardware or operating system and allows a program to execute in the same way on any platform. In one embodiment, the PVM 102 executes an application 104. The application 104 may include any computer-executable program capable of communicating with the operating system. Some of these applications may include, but are not limited to, voice mail applications, web applications, Microsoft™ applications, an Eclipse integrated development environment (IDE), and/or other applications.

In one embodiment, a process virtual machine is a Java™ virtual machine (JVM). A JVM is a set of computer software programs and data structures that use a virtual machine model for the execution of other computer programs such as compiled Java™ programs and programs in other languages supported by the JVM (e.g., Python, Ruby, etc.). In one embodiment, the application 104 executes a Java™ application. As used herein, the Java™ application is computer software designed to perform a specific task and executing in the JVM. Examples of an application include enterprise software, accounting software, office suites, graphics software, and media players.

In one embodiment, the computer system 100 comprises a hardware platform 120, on top of which runs an operating system (OS) 108 that executes the application 104. The OS 108 may include Microsoft Windows™, Linux™, Solaris™, Mac™ OS or any other suitable operating system for managing operations on the computer system 200. In one embodiment, the application 104 executed by the OS 108 comprise multiple applications. In some embodiments, the multiple applications may be separate individual applications or multiple versions of the same application, or a combination of both. In one embodiment, the OS 108 executes the PVM 102 that provides the individual or multiple applications.

In one embodiment, the PVM 102 includes a memory 106, which includes data needed to execute the application 104. Such data includes, but is not limited to, bytecodes, information extracted from class files including any dependencies, objects to be instantiated by the application, parameters to methods, return values, local variables and intermediate results of the computations.

The hardware platform 120 may include one or more processing devices 122 and a data store 124. In one embodiment, the data store 124 comprises one or more hardware or software devices, which may be located internally or externally to the computer system 100. Examples of data store 124 may include, but are not limited to, random-access memory (RAM), non-volatile storage memory (e.g., Flash, EEPROM, solid state drives (SSD), etc.), magnetic storage memory (e.g., one or more hard drives), and optical memory (e.g., PDS, DVD, BlueRay drives, etc.). In addition, hardware platform 120 may include additional hardware devices 126, such as network interface cards (NICs), sound or video adaptors, photo/video cameras, printer devices, keyboards, displays or any other suitable device intended to be coupled to a computer system.

In one embodiment, the PVM 102 includes an application migration module (AMM) 112 for migrating the application 104 executing on the PVM 102 to another PVM (not shown). In one embodiment, the another PVM is different from the PVM 102. In one embodiment, the AMM 112 pauses execution of the application 104 and records a state of the PVM 102 at the time of the pausing of the execution of the application 104. In one embodiment, the state is a condition or a status of a thread associated with the Java™ application that changes with time. In one embodiment, the state of the PVM 102 is recorded by taking a snap shot of the PVM 102. In one embodiment, the snapshot is a file-based representation of the state of the PVM 102 at the time of the pausing of the execution of the application 104. In one embodiment, the snapshot of the state of the PVM 102 is stored in a hard drive or other memory of the computer system 100, such as in the data store 124.

In one embodiment, the AMM 112 copies the recorded state of the PVM 102 into the another PVM in order to recreate the state of the PVM 102 in the another JVM, as will be described in detail below.

Figure 2:
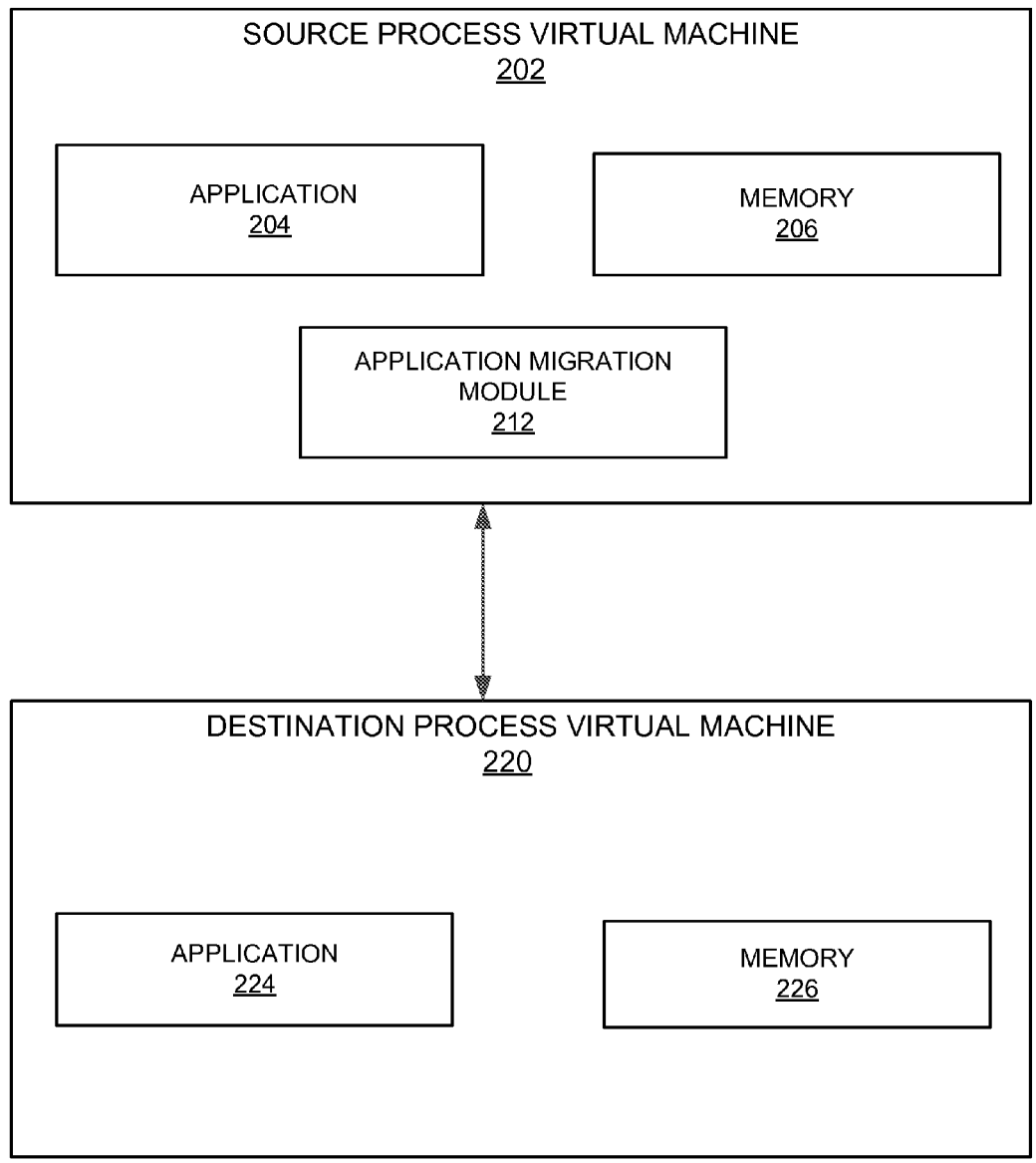
FIG. 2 illustrates a block diagram of a computer system according to one embodiment of the invention.

FIG. 2 is a block diagram that illustrates a source (e.g., originating) PVM 202 communicably coupled to a destination PVM 220 in which embodiments of the disclosure may operate. As discussed above, a process virtual machine is an abstract computing machine that provides a platform-independent programming environment that abstracts away details of underlying hardware or operating system and allows a program to execute in the same way on any platform. In one embodiment, the source PVM 202 executes an application 204.

In one embodiment, the source PVM 202 is same as the PVM 102 of FIG. 1. In another embodiment, the application 204 is same as the application 104 of FIG. 1. In one embodiment, the source PVM 202 is a Java™ Virtual Machine (JVM). In one embodiment, the application 204 is a Java™ application.

In one embodiment, the destination PVM 220 executes an application 224. In one embodiment, the destination PVM 220 is a Java™ Virtual Machine (JVM). In one embodiment, the application 224 is a Java™ application.

As discussed above, a JVM is a set of computer software programs and data structures that use a virtual machine model for the execution of other computer programs such as compiled Java™ programs and programs in other languages supported by the JVM (e.g., Python, Ruby, etc.). Also, as discussed above, the Java™ application is computer software designed to perform a specific task and executing in the JVM. Examples of a Java™ application include enterprise software, accounting software, office suites, graphics software, and media players.

In one embodiment, the destination PVM 220 allocates all system resources from the source PVM 202. The system resources are registered in the source PVM 202, which are provided to the destination PVM 220. In one embodiment, the system resources in the source PVM 202 are migrated to the destination PVM 220. Such system resources include, but are not limited to, network sockets, file handles and graphic contexts. As such, system resources are shared between the source PVM 202 and the destination PVM 220.

In one embodiment, the source PVM 202 includes an application migration module (AMM) 212 for migrating the application 204 executing on the source PVM 202 to the destination PVM 220. In one embodiment, the AMM 212 is same as the AMM 112 of FIG. 1. In one embodiment, the AMM 212 pauses execution of the application 204 in the source PVM 202. The AMM 212 may record a state of the source PVM 202 at the time of the pausing of the execution of the application 204. In one embodiment, the state is a condition or a status of a thread associated with the application that changes with time. In one embodiment, the state of the source PVM 202 is recorded by taking a snap shot of the source PVM 202. In one embodiment, the snapshot is a file-based representation of the state of the source PVM 202 at the time of the pausing of the execution of the application 204. In one embodiment, the snapshot of the state of source PVM 202 is stored in a hard drive or other memory of the computer system.

In one embodiment, the AMM 212 creates t a new process on the destination PVM 220. I, the new process is created with a memory 226, which is initially empty to be laterlled with the data used to execute the an application 224 in the destination PVM 220. In one embodiment, the memory 226 is same size as the memory 206 of the source PVM 202.

In one embodiment, the AMM 212 copies the recorded state of the source PVM 202 into the destination PVM 220. In one embodiment, the destination PVM 220 is selected among a plurality of PVMs. The destination PVM 220 may be selected based on monitoring of utilization of the PVMs in the cluster. As such, the destination PVM 220 may be selected when it is not being utilized to its full capacity. The recorded state of the source PVM 202 is copied into the memory 226 of the destination PVM 220. As such, exact state of the source PVM 202 is recreated on the destination PVM 220. Accordingly, when the state of the source PVM 202 is recreated in the destination PVM 220, the memory 226 in the destination PVM 220 includes the same data as the memory 206 in the source PVM 202. As discussed above, the data includes, but is not limited to, bytecodes, information extracted from class files including any dependencies, objects to be instantiated by the application, parameters to methods, return values, local variables and intermediate results of the computations.

In one embodiment, the application 224 on the destination PVM 220 is executed based on the recorded state of the source PVM 202. As such, execution of the application 204 that was paused in the source PVM 202 resumes in the application 224 of the destination PVM 220.

In one embodiment, the execution of the application 204 resumes execution from the paused state in the source PVM 202. As such, both the application 204 in the source PVM 202 and the application 224 in the destination PVM 220 execute using the same state at the same time. Accordingly, two instances of the same application execute from the same state without having to deploy, restart or configure a new application.

In one embodiment, the AMM 212 destroys the source PVM 202 after the exact state of the source PVM 202 is recreated on the destination PVM 220. In one embodiment, the thread associated with the application 104 executing on the source PVM 202 is destroyed. In one embodiment, the AMM 212 checks the execution of the application 224 on the destination PVM 220 prior to destroying the source PVM 202. In one embodiment, in response to the AMM 212 determining that the application 224 in the destination PVM 220 is not able to execute normally from the recorded state of the source PVM 202, the application 204 in the source PVM 202 resumes execution from the paused state in the source PVM 202. In another embodiment, in response to the AMM 212 determining that the application 224 in the destination PVM 220 is able to execute normally from the recorded state of the source PVM 202, the AMM 212 destroys the source PVM 202.

In one embodiment, the source PVM 202 and the destination PVM 220 are located and operating in a same computer system. In another embodiment, the source PVM 202 and the destination PVM 220 may be located and operating in different computer systems.

Figure 3:
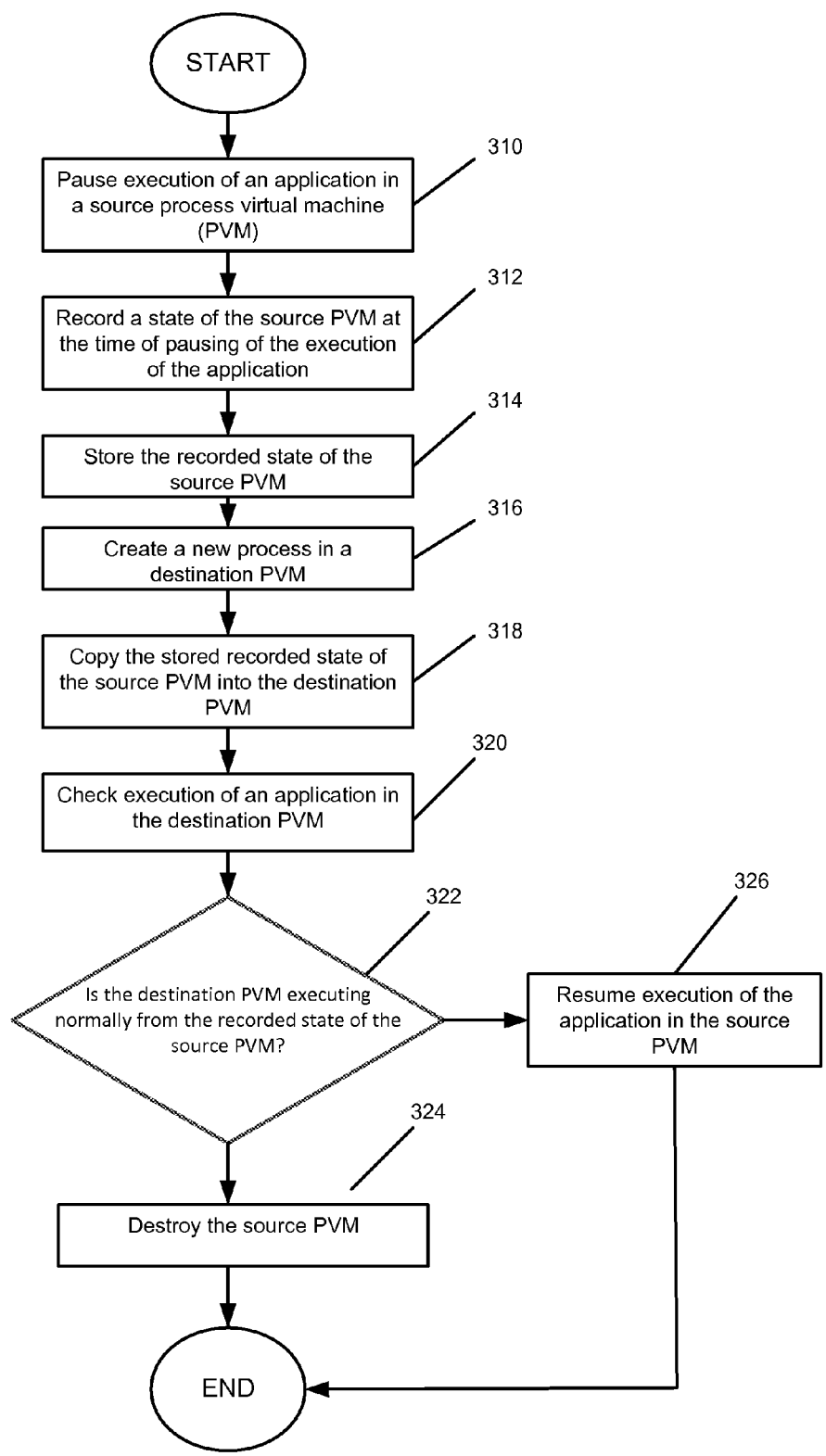
FIG. 3 is a flow diagram of one embodiment of a method for migrating a Java™ application.

FIG. 3 is a flow diagram illustrating a method 300 for migrating an application in a process virtual environment according to an embodiment of the invention. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by the application migration module (AMM) 112 of FIG. 1 and/or AMM 212 of FIG. 2.

Method 300 begins at block 310 where execution of an application in a source process virtual machine (PVM) is paused. As discussed above, a process virtual machine is an abstract computing machine that provides a platform-independent programming environment that abstracts away details of underlying hardware or operating system and allows a program to execute in the same way on any platform. In one embodiment, the source PVM is a Java™ Virtual Machine (JVM). In one embodiment, the application is a Java™ application.

At block 312, a state of the source PVM is recorded at the time of pausing of the execution of the application. As discussed above, a state is condition or a status of a thread associated with the application that changes with time. In one embodiment, the state of the source PVM is recorded by taking a snap shot of the source PVM. As discussed above, a snapshot is a file-based representation of the state of the source PVM at the time of the pausing of the execution of the application in the source PVM. At block 314, store the recorded state of the source PVM. In one embodiment, the recorded state of the source is stored in a data store of the computer system.

At block 316, an application a new process is created in a destination PVM. In one embodiment, the new process is created with a memory, which is initially empty to be later filled with the data used to execute an application in the destination PVM. As discussed above, the data includes bytecodes, information extracted from class files including any dependencies, objects to be instantiated by the application, parameters to methods, return values, local variables and intermediate results of the computations. In one embodiment, the memory created in the destination PVM is same size as memory of the source PVM.

In one embodiment, the destination PVM is selected among a plurality of PVMs. The destination PVM may be selected based on monitoring of utilization of the PVMs in the cluster. As such, the destination PVM may be selected when it is not being utilized to its full capacity. In one embodiment, the destination PVM is a Java™ Virtual Machine (JVM). In one embodiment, the application is a Java™ application. As discussed above, the data includes bytecodes, information extracted from class files including any dependencies, objects to be instantiated by the application, parameters to methods, return values, local variables and intermediate results of the computations. In one embodiment, the memory created in the destination PVM is same size as memory of the source PVM.

At block 318, the stored recorded state of the source PVM is copied into the destination PVM. In one embodiment, the stored recorded state of the source PVM is copied into the empty memory of the destination PVM. As such, exact state of the source PVM is recreated on the destination PVM. Accordingly, when the state of the source PVM is recreated in the destination PVM, the memory in the destination PVM includes the same data as the memory in the source PVM. In one embodiment, the application on the destination PVM is executed based on the recorded state of the source PVM. As such, execution of the application that was paused in the source PVM will resume in the application of the destination PVM.

At block 320, execution of the an application in the destination PVM is checked. In one embodiment, the execution is checked by determining whether the instructions have started processing in the application in the destination PVM. At block 322, it is determined whether the application in the destination PVM is executing normally from the recorded state of the source PVM. In one embodiment, it is determined that the destination PVM does executes normally unless certain conditions occur. Such conditions include, but are not limited to, stopping of the instruction processing in the application in the destination PVM, terminating of the application in the destination PVM, failure to look up some methods or objects in the memory or similar incorrect behavior depending on the PVM implementation and environment. At block 324, the source PVM is destroyed when at block 322, it is determined that the application in the destination PVM is executing normally from the recorded state of the source PVM. At block 326, execution of the application in the source PVM is resumed when at block 322, it is determined that the application in the destination PVM is not executing normally from the recorded state of the source PVM.

Figure 4:
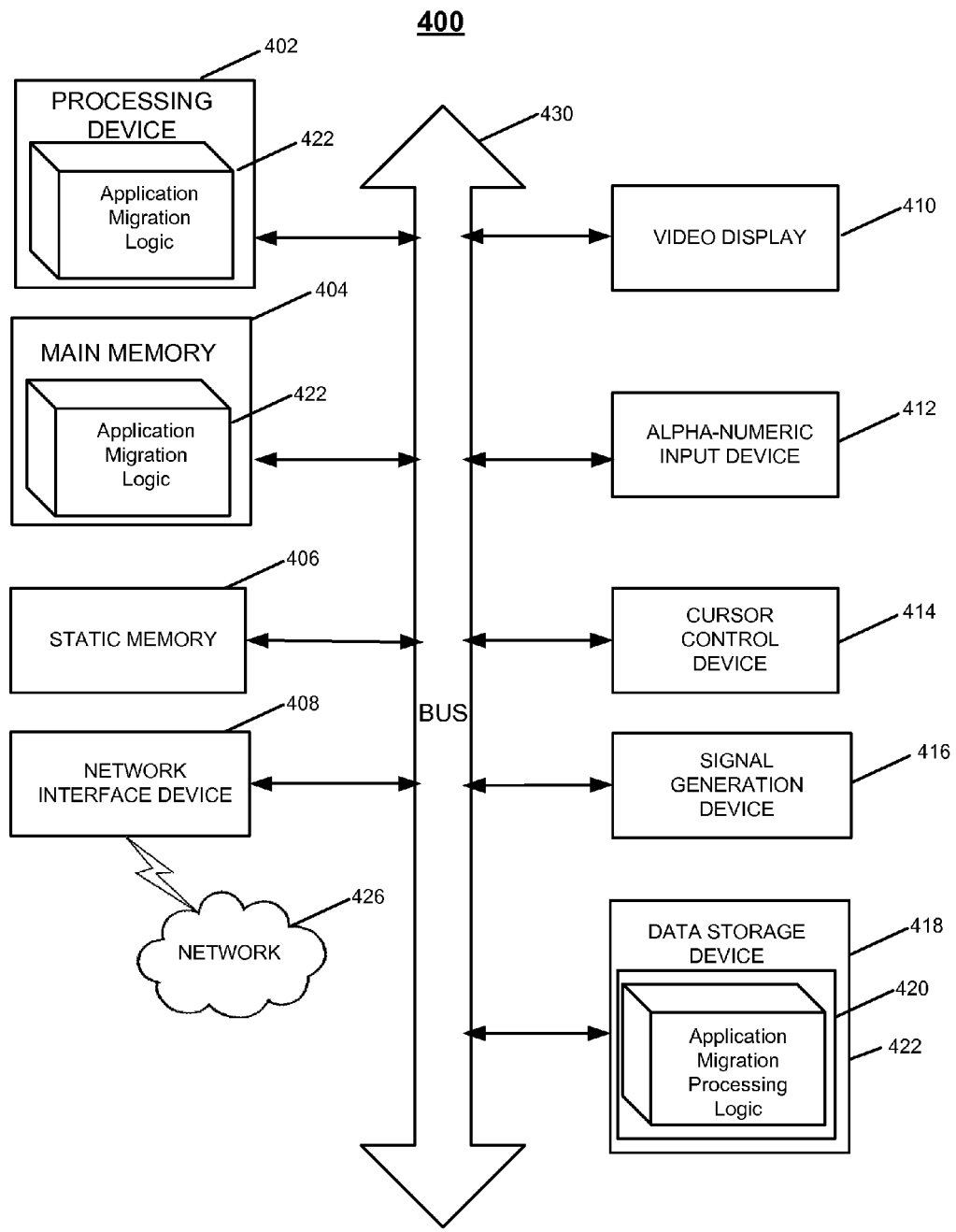
FIG. 4 illustrates a block diagram of one embodiment of a computer system.

FIG. 4 illustrates a diagrammatic representation of a machine in the example form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 400 includes a processing device 402 (e.g., processor, CPU, etc.), a main memory 404 (e.g., read-only memory (ROM), flash memory, dynamic random access memory (DRAM) (such as synchronous DRAM (SDRAM) or DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 422 communicably coupled to a network 464. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 418 may include a machine-accessible storage medium 424 on which is stored software 426 embodying any one or more of the methodologies of functions described herein. The software 426 may also reside, completely or at least partially, within the main memory 404 as instructions 426 and/or within the processing device 402 as processing logic 426 during execution thereof by the computer system 400; the main memory 404 and the processing device 402 constituting machine-accessible storage media.

The machine-readable storage medium 424 may also be used to store instructions 426 to implement application migration in a process virtual machine environment to migrate execution of an application from one process VM to another process VM, such as performed by the application migration module (AMM) 212 described with respect to FIG. 2, and/or a software library containing methods that call the above applications. While the machine-accessible storage medium 424 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as, "storing", "pausing", "recording", "copying", "creating", "executing", "determining", "destroying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the method steps. The structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

What is claimed is:

1. A method, comprising:
pausing, by a processing device, an execution of an application in a source process virtual machine (PVM) among a plurality of PVMs;
recording, by the processing device, a state of the source PVM at a time of the pausing of the execution of the application;
selecting, by the processing device, a destination PVM among the plurality of PVMs in view of an availability of amount of utilization of each of the plurality of PVMs; and
copying, by the processing device, the recorded state of the source PVM into the selected destination PVM, wherein the selected destination PVM resumes the execution of the application using the recorded state.

2. The method of claim 1 further comprising creating a process in the selected destination PVM.

3. The method of claim 2, wherein the created process executes the application in the selected destination PVM in view of the copied recorded state of the source PVM.

4. The method of claim 3 wherein the execution of the paused application in the source PVM is resumed by the application in the selected destination PVM.

5. The method of claim 4 further comprising determining whether the application in the selected destination PVM is executing from the recorded state of the source PVM.

6. The method of claim 5 destroying the source PVM upon the determining that the application in the selected destination PVM is executing from the recorded state of the source PVM.

7. The method of claim 1 wherein the application is a Java™ programming language application, and wherein the source PVM and the selected destination PVM are Java™ virtual machines (JVMs).

8. A system, comprising:
a memory;
a processing device operatively coupled to the processing device to:
pause an execution of an application in a source process virtual machine (PVM) among a plurality of PVMs;
record a state of the source PVM at a time of the pausing of the execution of the application;
select a destination PVM among the plurality of PVMs in view of an availability of amount of utilization of each of the plurality of PVMs; and
copy the recorded state of the source PVM into the selected destination PVM,
wherein the selected destination PVM resumes the execution of the application using the recorded state.

9. The system of claim 8, the processing device to:
create a process in the selected destination PVM.

10. The system of claim 9 wherein the created application process executes the application in the selected destination PVM in view of the copied recorded state of the source PVM.

11. The system of claim 10 wherein the application in the selected destination PVM executes in view of the copied recorded state of the source PVM.

12. The system of claim 11, wherein the execution of the paused application in the source PVM is resumed by the application in the selected destination PVM.

13. The system of claim 12, the processing device to:
destroy the source PVM upon determining that the application in the selected destination PVM is executing from the recorded state of the source PVM.

14. The system of claim 8 wherein the application is a Java™ programming language application, and wherein the source PVM and the selected destination PVM are Java™ virtual machines (JVMs).

15. A non-transitory machine-readable storage medium comprising instructions that, when accessed by a processing device, cause the processing device to:
pause, by the processing device, an execution of an application in a source process virtual machine (PVM) among a plurality of PVMs;
record, by the processing device, a state of the source PVM at a time of the pausing of the execution of the application;
select, by the processing device, a destination PVM among the plurality of PVMs in view of an availability of amount of utilization of each of the plurality of PVMs; and
copy, by the processing device, the recorded state of the source PVM into the selected destination PVM, wherein the selected destination PVM resumes the execution of the application using the recorded state.

16. The non-transitory machine-readable storage medium 15, wherein the processing device is to create a process in the selected destination PVM.

17. The non-transitory machine-readable storage medium 16, wherein the created process executes the application in the selected destination PVM in view of the copied recorded state of the source PVM.

18. The non-transitory machine-readable storage medium 17, wherein the execution of the paused application in the source PVM is resumed by the application in the selected destination PVM.

19. The non-transitory machine-readable storage medium 18, wherein the processing device is to destroy the source PVM upon determining that the application in the selected destination PVM is executing from the recorded state of the source PVM.

20. The non-transitory machine-readable storage medium 15, wherein the application is a Java™ programming language application, and wherein the source and selected destination PVMs are Java™ virtual machines (JVMs).

* * * * *